United States Patent
Wang et al.

(10) Patent No.: US 12,332,386 B2
(45) Date of Patent: **\*Jun. 17, 2025**

(54) OPTICAL TIME OF FLIGHT SENSOR FOR NAVIGATION SYSTEMS IN ROBOTIC APPLICATIONS

(71) Applicant: Texas Instruments Incorporated, Dallas, TX (US)

(72) Inventors: Yichang Wang, Suzhou (CN); Karthik Rajagopal Ganapathy, Allen, TX (US); Raja Reddy Patukuri, Telangana (IN)

(73) Assignee: Texas Instruments Incorporated, Dallas, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/343,159

(22) Filed: Jun. 28, 2023

(65) Prior Publication Data

US 2023/0341528 A1    Oct. 26, 2023

Related U.S. Application Data

(63) Continuation of application No. 16/663,016, filed on Oct. 24, 2019, now Pat. No. 11,733,360, which is a
(Continued)

(51) Int. Cl.
*G01S 7/4865* (2020.01)
*B25J 9/16* (2006.01)
(Continued)

(52) U.S. Cl.
CPC .............. *G01S 7/4865* (2013.01); *B25J 9/163* (2013.01); *G01S 17/89* (2013.01); *G05D 1/0088* (2013.01)

(58) Field of Classification Search
CPC ...... G01S 7/4865; G01S 17/89; G01S 7/4815; G01S 17/36; G01S 17/931; B25J 9/163;
(Continued)

(56) References Cited

U.S. PATENT DOCUMENTS

| 7,952,690 B2 | 5/2011 | Cauquy |
| 9,915,951 B2 | 3/2018 | Mei |

(Continued)

FOREIGN PATENT DOCUMENTS

| CN | 202093394 U | 12/2011 |
| CN | 205799475 U | 12/2016 |

(Continued)

OTHER PUBLICATIONS

Machine Translation: CN-108132068-A (Year: 2018).*
International Search Report in corresponding PCT Application No. PCT/CN2019/089971, mailed Mar. 4, 2020 (4 pgs).

*Primary Examiner* — Anne Marie Antonucci
*Assistant Examiner* — Connor L Knight
(74) *Attorney, Agent, or Firm* — Mandy Barsilai Fernand; Frank D. Cimino

(57) ABSTRACT

A system comprises a photosensor and a controller. A first photoemitter transmits light onto objects at first height, a second photoemitter onto objects at second, lower height, and a third photoemitter onto objects at third, lowest height. The controller causes one of the photoemitters to transmit modulated light and the photosensor to receive reflections from a scene. The controller determines a depth map for the corresponding height based on phase differences between the transmitted and reflected light. In some examples, the system is included in an autonomous robot's navigation system. The navigation system identifies overhanging objects at the robot's top from the depth map at the first height, obstacles in the navigation route from a second depth
(Continued)

map at the second height, and cliffs and drop-offs in the ground surface in front of the robot from the third depth map at the third height.

19 Claims, 4 Drawing Sheets

Related U.S. Application Data continuation of application No. PCT/CN2019/089971, filed on Jun. 4, 2019.

(51) Int. Cl.
*G01S 17/89* (2020.01)
*G05D 1/00* (2024.01)

(58) Field of Classification Search
CPC ... G05D 1/0088; G05D 1/0238; G05D 1/0255
See application file for complete search history.

(56) References Cited

U.S. PATENT DOCUMENTS

| | | |
|---|---|---|
| 11,353,588 B2 | 6/2022 | Onal |
| 11,726,490 B1 * | 8/2023 | Ebrahimi Afrouzi ..... G06T 7/70 700/259 |
| 2008/0174268 A1 * | 7/2008 | Koo ...................... H02J 7/0045 320/109 |
| 2013/0088726 A1 | 4/2013 | Goyal |
| 2017/0261314 A1 * | 9/2017 | Konolige ................ G06T 7/593 |
| 2018/0169863 A1 | 6/2018 | Bushman |
| 2018/0239019 A1 | 8/2018 | Steever |
| 2018/0300891 A1 | 10/2018 | Wang |
| 2019/0146504 A1 | 5/2019 | Lee |
| 2019/0220025 A1 | 7/2019 | Chen |
| 2019/0302793 A1 | 10/2019 | Leech |
| 2020/0041620 A1 | 2/2020 | Onal |
| 2020/0114509 A1 * | 4/2020 | Lee ...................... G01S 15/931 |
| 2020/0338744 A1 | 10/2020 | Wang |
| 2022/0299650 A1 * | 9/2022 | Forsberg ............... A47L 9/2805 |

FOREIGN PATENT DOCUMENTS

| | | | | |
|---|---|---|---|---|
| CN | 107065870 A | | 8/2017 | |
| CN | 107757751 A | | 3/2018 | |
| CN | 207189671 U | | 4/2018 | |
| CN | 108132068 A | * | 6/2018 | ........... G01B 11/026 |

* cited by examiner

OPTICAL TIME OF FLIGHT SENSOR FOR NAVIGATION SYSTEMS IN ROBOTIC APPLICATIONS

CROSS-REFERENCE TO RELATED APPLICATIONS

This application is a continuation of U.S. patent application Ser. No. 16/663,016, filed Oct. 24, 2019, which is a continuation of International Application No. PCT/CN2019/089971, filed Jun. 4, 2019, which applications are hereby incorporated herein by reference.

BACKGROUND

Autonomous robots combine information from a variety of sensors to map the surrounding environment and determine appropriate navigation paths, as well as avoid obstacles and the like. The sensors and navigation systems for autonomous robots must function in a variety of diverse environments and working conditions, such as full sunlight, dim streetlights, full darkness, highly reflective and light-colored objects, and poorly reflective and dark-colored objects. The sensors and navigation systems must also detect unique navigation situations such as overhanging objects, obstacles in the navigation path, and drop-offs. Amplitude based infrared sensors struggle to perform consistently in all environments, particularly in direct sunlight, in addition to inconsistencies based on the color of objects. Ultrasonic sensors are more consistent with respect to object color, but are limited by a low data rate resulting from the comparatively slow speed of sound and the forced delay while waiting for ultrasonic reflections. Amplitude based infrared and ultrasonic sensors can be insufficient for autonomous robot navigation systems.

SUMMARY

A time of flight (ToF) system includes three photoemitters, a photosensor, and a controller. The first photoemitter is oriented such that light transmitted by the first photoemitter is reflected off objects at a first height. The second photoemitter is oriented such that light transmitted by the second photoemitter is reflected off objects at a second height, lower than the first height. The third photoemitter is oriented such that light transmitted by the third photoemitter is reflected off objects at a third height, lower than the second height. The photosensor receives light reflected from a scene. The controller is configured to cause a particular photoemitter from the three photoemitters to transmit a modulated light signal, and cause the photosensor to receive a reflected light signal. The controller is then configured to determine a depth map for the scene at a height corresponding to the particular photoemitter based on a phase difference between the modulated light signal and the reflected light signal.

In some examples, the ToF system is included in a navigation system for an autonomous robot, and assists the navigation system in determining a navigation route for the robot. The first height corresponds to a top of the robot, the second height corresponds to objects in the navigation route for the robot, and the third height corresponds to a ground surface in front of the robot. The navigation system is configured to identify overhanging objects at the height of the top of the robot and a distance between the ToF system and the overhanging objects based on the depth map for the scene at the first height. The navigation system then determines an adjustment to the navigation route for the robot based on the depth map, such that the robot does not get stuck underneath the overhanging objects.

The navigation system is configured to identify obstacles in the navigation route for the robot and a distance between the ToF system and the obstacles in the navigation route based on the depth map for the scene at the second height. The navigation system then determines an adjustment to the navigation route for the robot based on the depth map, such that the robot does not collide with the obstacles. The navigation system is configured to identify cliffs and drop-offs in the ground surface in front of the robot and a distance between the ToF system and the cliffs and drop-offs based on the depth map for the scene at the third height. The navigation system then determines an adjustment to the navigation route for the robot based on the depth map, such that the robot does not fall over the cliffs and drop-offs.

In some examples, the photoemitters are light emitting diodes, configured to transmit near infrared light signals. In some examples, the controller is further configured to compare an amplitude of the reflected light signal to a first threshold and a second, lower threshold. In response to the amplitude of the reflected light signal being greater than the first threshold, the controller is configured to cause the particular photoemitter to transmit the modulated light signal at a first amplitude. In response to the amplitude of the reflected light signal being less than the second threshold, the controller is configured to cause the particular photoemitter to transmit the modulated light signal at a second amplitude.

BRIEF DESCRIPTION OF THE DRAWINGS

For a detailed description of various examples, reference will now be made to the accompanying drawings in which.

DETAILED DESCRIPTION

As noted above, some sensors included in navigation systems for autonomous robots do not work consistently in all environments or identify unique navigation situations early enough to adjust the behavior of the robot. The disclosed time of flight (ToF) systems use multiple photoemitters to illuminate different regions of a robot's environment, and determine the distance between the robot and the environment based on a phase difference between the transmitted light and received reflections from the environment. Because the distance determinations are based on phase differences rather than signal amplitudes, the examples described herein are relatively impervious to the color and reflectivity of objects in the environment. Further, the distance determinations provide much finer resolution distance information than some amplitude based infrared or ultrasonic sensor systems, and enable finer control of the robot's actions.

An example ToF system for autonomous robot navigation includes three photoemitters: one oriented to illuminate overhanging objects, one oriented to illuminate obstacles in the robot's navigation route, and one oriented to illuminate the ground immediately in front of the robot. The ToF system also includes a photosensor to receive light reflected from the scene, and a processor configured to cause the three photoemitters to transmit modulated light one at a time, cause the receiver to receive reflected light, and determine a depth map for the scene based on a phase difference between the modulated light signal and the reflected light signal. The depth map identifies overhanging objects, obstacles, and cliffs in the environment, and distances between the ToF system and the environment.

Figure 1A:
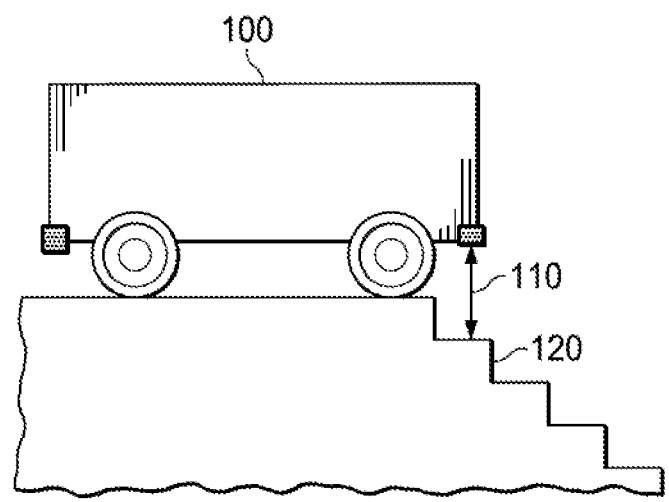
FIGS. 1A-C show three example navigation situations for an autonomous robot.
Figure 1B:
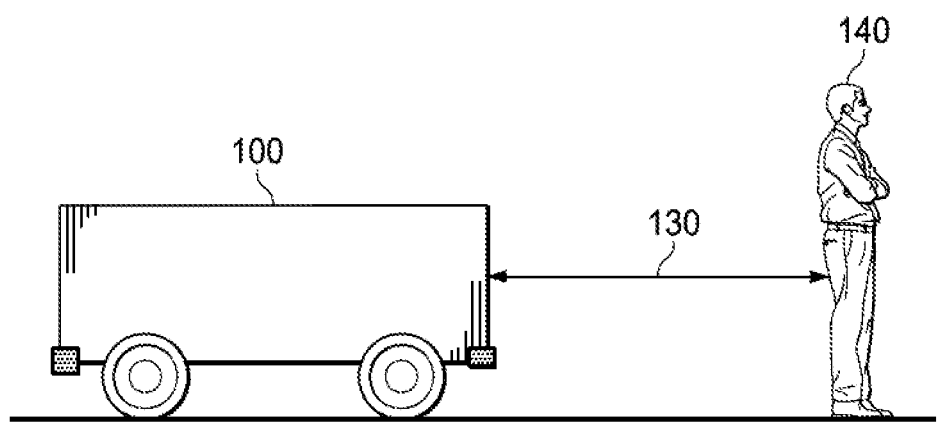
Figure 1C:
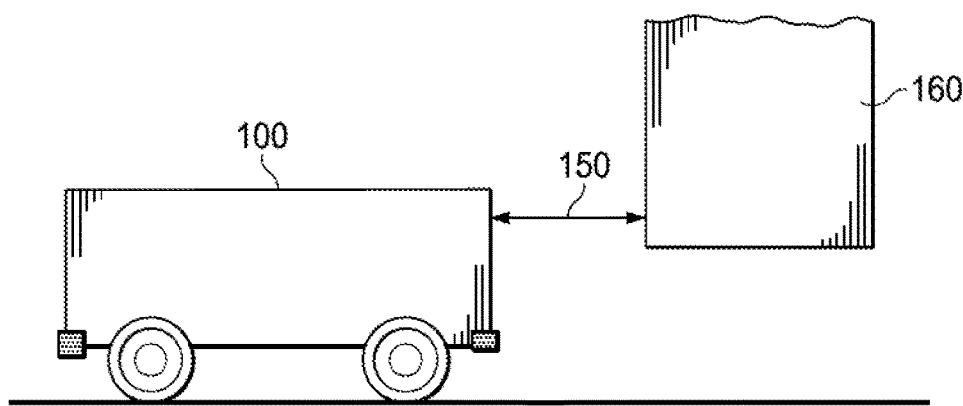

FIGS. 1A-C show three example navigation situations for an autonomous robot 100. FIG. 1A shows an example navigation situation in which robot 100 is at the top of stairs 120 and near the edge of drop-off 110. If robot 100 is moving too quickly and does not detect cliff 110 early enough, robot 100 will fall down stairs 120. Large, heavy robots falling down heavily trafficked stairs pose a safety risk to other people using the stairs. If robot 100 includes a cliff detection sensor placed on an underside of robot 100, such as an infrared sensor, it will not detect drop-off 110 until the cliff detection sensor is over the edge of drop-off 110. Depending on the placement of the cliff detection sensor and the weight distribution of robot 200, the cliff detection sensor will not detect cliff 110 in time to prevent robot 100 from falling down stairs 120, no matter how quickly or slowly robot 100 moves.

Further, an example infrared sensor determines distances by transmitting a pulse and measuring the amplitude of light reflected by the scene. The amplitude of the received reflection is used to determine the distance between the infrared sensor and the floor or cliff 110. Because the strength of the received reflection can depend on the color and reflectivity of the floor or cliff 110, and ambient lighting such as direct sunlight, this type of infrared sensor is sensitive to environmental conditions, which may cause it to misidentify dark colored carpet or flooring such as concrete for cliff edges.

FIG. 1B shows an example navigation situation in which robot 100 is a distance 130 from a person 140. If robot 100 includes pressure sensors which detect objects near robot 100 through collisions, it is likely to injure person 140. If robot 100 includes an ultrasonic sensor to detect objects near robot 100, it may be able to identify objects before colliding with them but cannot quickly update its knowledge of the environment. The example ultrasonic sensor is limited to a lower data rate because it must wait for reflections from the comparatively slow traveling sound signal. If robot 100 includes an infrared sensor to detect objects near robot 100, it may be able to identify objects before colliding with them but is vulnerable to environmental conditions such as the color and reflectivity of the objects and direct sunlight, as described herein with reference to FIG. 1A.

The example infrared sensor is also limited to a yes-no comparison to a predetermined distance threshold set by a user. That is, the infrared sensor only identifies objects when robot 100 is within a predetermined distance of the object. Depending on the speed robot 100 is moving, this predetermined distance may not be enough time to reroute robot 100 away from person 140. The vulnerability of infrared sensors to environmental conditions further complicates navigation for robot 100 based on the yes-no comparison to a predetermined distance. For example, an infrared sensor may indicate a light-colored object is within the predetermined distance but indicate a dark-colored object at the same location is not within the predetermined distance. Although an ultrasonic sensor can be used to determine an accurate distance between the object and the sensor, ultrasonic sensors have limited fields of view. The already limited field of view can be further narrowed by obstruction of the acoustic window, such as by dust, pet hair, etc.

FIG. 1C shows an example navigation situation in which robot 100 is a distance 150 from an overhanging object 160. If robot 100 includes an object detection system focused on the ground, robot 100 may not recognize overhanging object 160. This can cause robot 100 to repeatedly collide with overhanging object 160 as robot 100 attempts to follows its route without adjustment, because robot 100 does not recognize overhanging object 160 is preventing it from moving forward. Depending on the weight distribution of robot 100 and the relative heights of robot 100 and overhanging object 160, robot 100 may knock itself over in a collision with overhanging object 160, potentially harming nearby people and objects or itself. If robot 100 includes a passive mechanical switch or a pressure sensor on its top surface to detect overhanging objects, robot 100 detects overhanging object 160 only after traveling underneath it. This can cause robot 200 to get stuck beneath overhanging object 260, unable to extricate itself.

Figure 2:
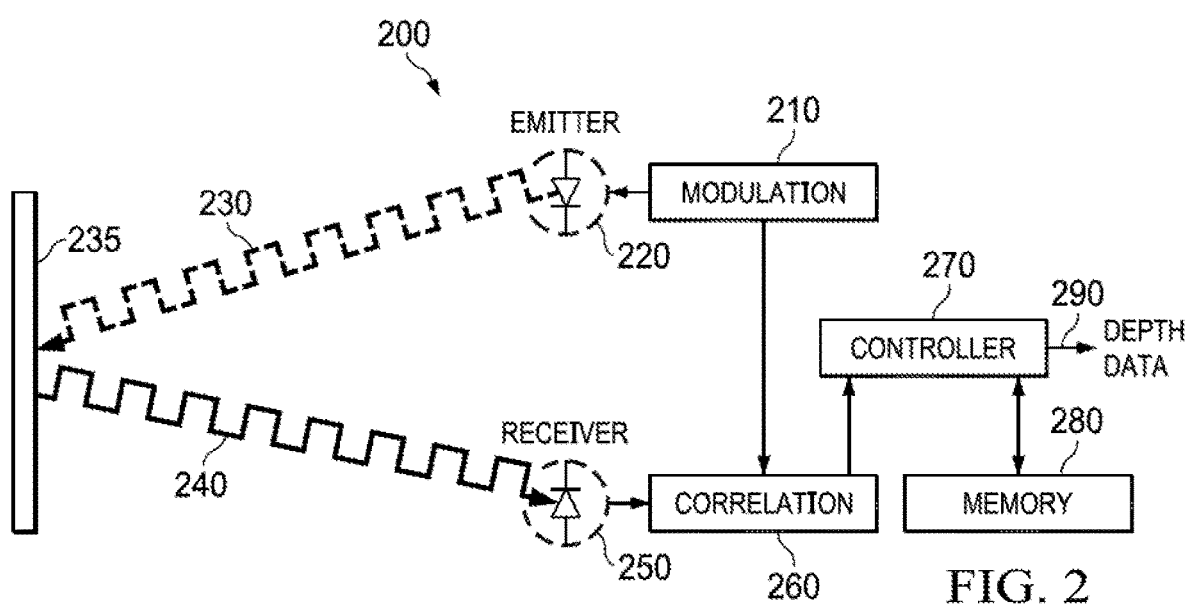
FIG. 2 illustrates an example time of flight (ToF) system for measuring distance.

FIG. 2 illustrates an example time of flight (ToF) system 200 for measuring distance. Example ToF system 200 includes a modulation circuit 210, an emitter 220, a receiver 250, a correlation circuit 260, a controller 270, and a memory 280. Modulation circuit 210 includes an illumination driver and causes emitter 220 to project a modulated light signal 230 onto the scene 235. Some ToF systems include other optical elements such as lenses, to assist in projection of modulated light signal 230 onto scene 235. Modulated light signal 230 reflects off objects in scene 235, and the reflected light signal 240 is received at receiver 250. In some implementations, receiver 250 is a photodiode or other photosensor. Some ToF systems include other optical elements such as lenses, to assist in collecting reflections off scene 235.

Correlation circuit 260 receives the reflected light signal 240 from receiver 250 and a reference signal from modulation circuit 210, representing the modulated light signal 230. Correlation circuit 260 correlates the reflected light signal 240 with the reference signal, and provides the resulting signal to controller 270. Controller 270 determines distances between ToF system 200 and objects in scene 235 based on indirect time of flight—a continuous modulated light signal 230 is emitted by emitter 220 and the phase difference between modulated light signal 230 and reflected light signal 240 is measured.

Controller 270 then calculates a distance between ToF system 200 and objects in scene 235 based on the phase difference. In some examples, controller 270 is one or more central processing units, digital signal processors, application specific integrated circuits, and the like. Controller 270 can be coupled to memory 280 and store and retrieve at least part of the provided data in memory 280. The determined distance between the ToF system 200 and objects in scene 235 can be output as depth data 290 to other devices.

Figure 3:
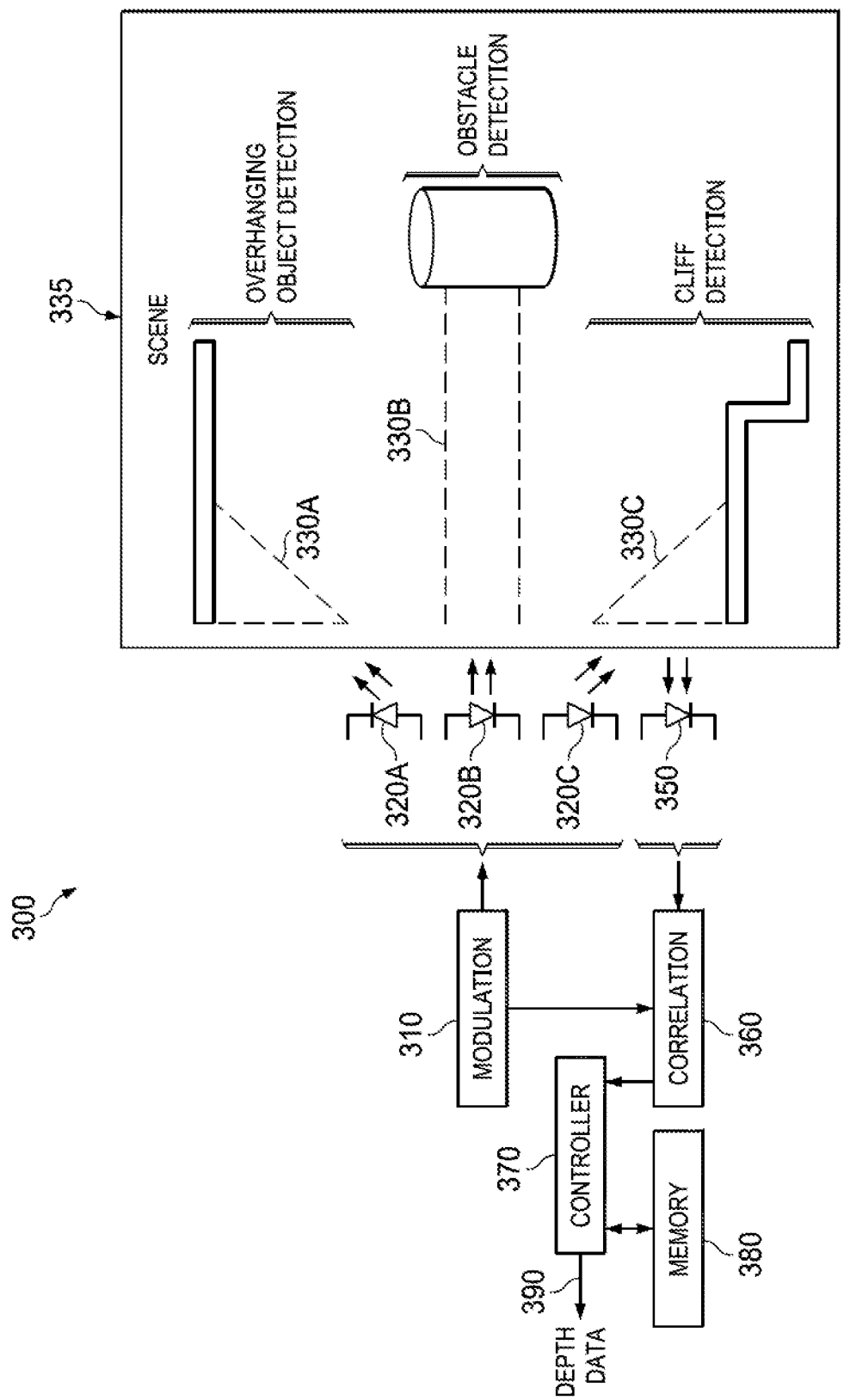
FIG. 3 illustrates an example indirect ToF navigation system for an autonomous robot.

FIG. 3 illustrates an example ToF based navigation system 300 for an autonomous robot. Example ToF navigation system 300 is similar to ToF system 200, and includes a modulation circuit 310, a receiver 350, a correlation circuit 360, a controller 370, and a memory 380. However, in contrast to ToF system 200, ToF navigation system 300 includes three emitters: 320A, 320B, and 320C. Emitter 320A is oriented at a first angle relative to a horizontal axis and configured to emit a modulated light signal 330A upwards and ahead of ToF navigation system 300, such that modulated light signal 330A reflects off overhanging objects in scene 335 and becomes reflected light signal 340A, not shown here. Reflected light signal 340A can be used by correlation circuit 360 and controller 370 to detect overhanging objects in scene 355.

Emitter 320B is oriented at a second angle relative to the horizontal axis, substantially in line with the horizontal axis, and configured to emit a modulated light signal 330B forward in front of ToF navigation system 300, such that modulated light signal 330B reflects off objects in scene 335 and becomes reflected light signal 340B, not shown here. Reflected light signal 340B can be used by correlation circuit 360 and controller 370 to detect objects in scene 355 and assist in object avoidance for the autonomous robot. Emitter 320C is oriented at a third angle relative to the horizontal axis, and configured to emit a modulated light signal 330C downwards and ahead of ToF navigation system 300, such that modulated light signal 330C reflects off the ground in scene 335 and becomes reflected light signal 340C, not shown here. Reflected light signal 340C can be used by correlation circuit 360 and controller 370 to detect the flooring condition and upcoming drop-offs in scene 335.

ToF navigation system 300 is able to adapt to environmental conditions in scene 335 such as object color by varying the driver current that modulation circuit 310 provides to emitters 320A, 320B, and 320C. In response to the amplitude of reflected light signal 340 being less than a lower illumination threshold, such as reflections from a dark-colored object, modulation circuit 310 can increase the driver current provided to emitters 320A, 320B, and 320C. In response to the amplitude of reflected light signal 340 being greater than a higher illumination threshold, such as reflections from a light-colored object, modulation circuit 310 can decrease the driver current provided to emitters 320A, 320B, and 320C. Further, because controller 370 determines distances between ToF navigation system 300 and the environment in scene 335 based on indirect time of flight and phase differences between emitted light and received reflections, rather than amplitude of the reflected light signals, ToF navigation system 300 is relatively impervious to the color and reflectivity of objects in scene 335.

Relying on indirect time of flight principles also allows ToF navigation system 300 to operate at a higher data rate than ultrasonic sensors, because it need not wait for a particular period of time to receive reflections. Thus, ToF navigation system 300 can quickly cycle through each of emitters 320A, 320B, and 320C and detect overhanging objects, obstacles in the autonomous robot's path, and upcoming drop-offs in scene 335. Indirect time of flight also allows ToF navigation system 300 to output higher resolution depth data 390 than an amplitude based infrared sensor, which outputs a yes-no comparison. The more detailed depth data 390 allows more flexibility and finer control of the robot's movement by a navigation decision system receiving the more detailed depth data 390. For example, the navigation decision system can cause the robot to decrease its speed by a first amount in response to being within a first, larger distance from a cliff and further decrease its speed by a second amount in response to being within a second, smaller distance from the cliff.

ToF navigation system 300 performs consistently despite ambient lighting conditions such as full sunlight. Because the light transmitted by emitters 320A, 320B, and 320C is modulated, correlation circuit 360 can reject any light received by photosensor 350 that is not modulated. Controller 370 determines a modulation frequency for emitters 320A, 320B, and 320C, and can adjust the modulation frequency based on the ambient lighting conditions, ensuring ToF navigation system 300 is relatively immune to a variety of lighting conditions, such as ambient light, full sunlight, and flickering ambient light.

Figure 4:
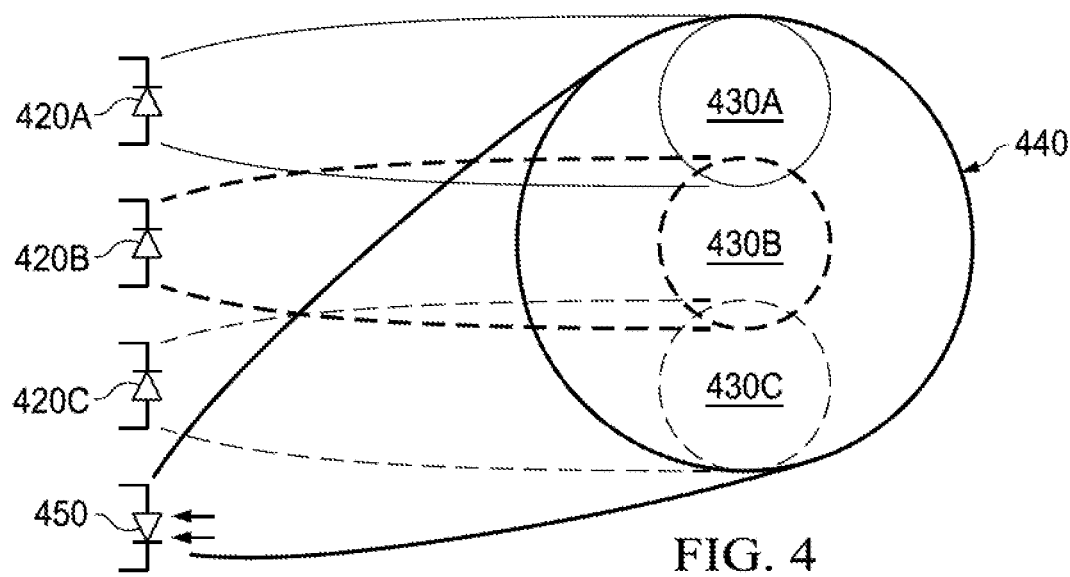
FIG. 4 illustrates illumination areas for emitters and a field of view of a receiver in an example indirect ToF navigation system.

FIG. 4 illustrates illumination areas for emitters 420A, 420B, and 420C, and a field of view for a receiver 450 in example ToF based navigation system. Circle 430A represents an area of a scene illuminated by modulated light from emitter 420A, which is oriented at an angle above a horizontal plane. Circle 430B represents an area of the scene illuminated by modulated light from emitter 420B, which is oriented substantially in line with the horizontal plane. Circle 430C represents an area of the scene illuminated by modulated light from emitter 430B, which is oriented at an angle below the horizontal plane. Circle 430A is comparatively higher in the scene than circles 430B and 430C, and situated such that the example ToF based navigation system can detect overhanging objects in the scene. Circle 430C is comparatively lower in the scene than circles 430A and 430B, and situated such that the example ToF based navigation system can detect upcoming cliffs and drop-offs in the scene. Circle 430B is between circles 430A and 430C in the scene, and situated such that the example ToF based navigation system can detect objects and obstacles in the scene. Circle 440 represents a field of view for receiver 450, and includes circles 430A, 430B, and 430C. Because receiver 450 has a larger field of view than the areas illuminated by emitters 420A, 420B, and 420C, a single receiver 450 can be used for all three emitters.

Figure 5:
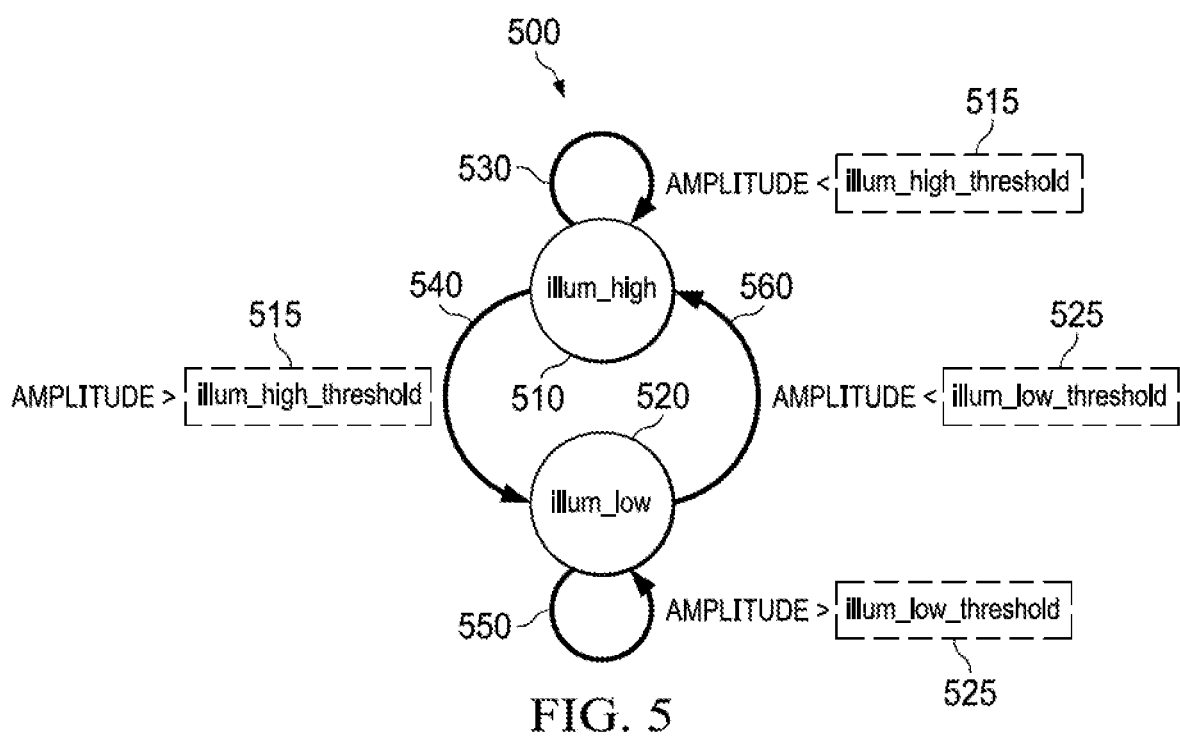
FIG. 5 shows a state diagram for selection of an illumination driver current in an example indirect ToF navigation system.

FIG. 5 shows a state diagram 500 for selection of an illumination driver current in an example ToF based navigation system. Illum_high 510 represents a higher illumination driver current, and illum_low 520 represents a lower illumination driver current. Illum_high 510 can be chosen to prevent reflected light signals from oversaturating a receiver in the ToF navigation system. Illum_low 520 can be chosen to prevent reflected light signals from being lost in system noise. At step 530, a modulation circuit including an illumination driver provides illum_high 510 to emitters in the ToF navigation system while the amplitude of reflected light signals is less than illum_high_threshold 515, at step 530. The amplitude of reflected light signals being less than illum_high_threshold 515 is indicative that the receiver in the ToF navigation system is not oversaturated.

In response to the amplitude of reflected lights signals being greater than illum_high_threshold 515 at step 540, such as reflections off a light-colored or highly reflective object, the modulation circuit transitions to illum_low 520 and provides illum_low 520 to emitters in the ToF navigation system, avoiding oversaturation of the receiver. At step 550, the modulation circuit continues to provide illum_low 520 to emitters while the amplitude of reflected light signals is greater than illum_low_threshold 525. The amplitude of reflected light signals being greater than illum_low_threshold 525 is indicative that reflected light signals are distinguishable from system noise. In response to the amplitude of reflected light signals being less than illum_low_threshold 525 at step 560, such as in response to reflections off a dark-colored or far away object, the modulation circuit transitions to illum_high 510 and provides illum_high 510 to emitters in the ToF navigation system. State diagram 500 allows the example ToF system to accommodate diverse environments without oversaturating the receiver or losing reflected light signals in noise. Although only two illumination driver currents are shown in state diagram 500, any number of illumination driver currents can be used, based on the particular implementation. In some ToF navigation systems, a sufficiently large number of illumination driver currents are used to implement an effectually continuous illumination driver current system.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A system, comprising:
   a photosensor configured to receive light reflected from a scene; and
   a controller configured to:
      cause a particular photoemitter from a first and a second photoemitters to transmit a modulated light signal;
      cause the photosensor to receive a reflected light signal;
      determine a first depth map for the scene at a first height corresponding to the first photoemitter based on a phase difference between the modulated light signal from the first photoemitter and the corresponding reflected light signal; and
      determine a second depth map for the scene at a second height corresponding to the second photoemitter based on a phase difference between the modulated light signal from the second photoemitter and the corresponding reflected light signal.

2. The system of claim 1, wherein the system is adapted to control a navigation system, the navigation system configured to determine a navigation route for a robot.

3. The system of claim 2, wherein the navigation system is configured to determine an adjustment to a navigation route based on the first depth map.

4. The system of claim 3, wherein the first height corresponds to a height of a top of the robot, wherein the second height corresponds to a height of objects in the navigation route for the robot, and wherein a third height corresponds to a ground surface in front of the robot.

5. The system of claim 4, wherein the navigation system is configured to identify an overhanging object at the first height and a distance between the robot and the overhanging object based on the first depth map.

6. The system of claim 4, wherein the navigation system is configured to identify an obstacle in the navigation route for the robot and a distance between the robot and the obstacle in the navigation route based on the second depth map for the scene at the second height.

7. The system of claim 4, wherein the navigation system is configured to identify a cliff in the ground surface in front of the robot and a distance between the robot and the cliff based on a third depth map for the scene at the third height, the third depth map determined using a third photoemitter.

8. The system of claim 1, wherein the controller is further configured to:
   compare an amplitude of the reflected light signal to a first threshold and a second threshold, wherein the second threshold is lower than the first threshold;
   in response to the amplitude of the reflected light signal being greater than the first threshold, cause the particular photoemitter to transmit the modulated light signal at a first amplitude; and
   in response to the amplitude of the reflected light signal being less than the second threshold, cause the particular photoemitter to transmit the modulated light signal at a second amplitude.

9. The system of claim 1, wherein the first, second, and third photoemitters comprise light emitting diodes.

10. A system, comprising:
    a photosensor; and
    a controller configured to:
       cause a particular photoemitter from a first, a second and a third photoemitters to transmit a modulated light signal, wherein the first photoemitter is at a first height and the second photoemitter is at a second height and the third photoemitter is at a third height, the second height is lower than the first height and the third height is lower than the second height;
       cause the photosensor to receive a reflected light signal;
       determine a first depth map for a scene based on the modulated light signal from the first photoemitter and the corresponding reflected light signal;
       determine a second depth map for the scene based on the modulated light signal from the second photoemitter and the corresponding reflected light signal; and
       determine a third depth map for the scene based on the modulated light signal from the third photoemitter and the corresponding reflected light signal.

11. The system of claim 10, wherein the system is adapted to control a navigation system, the navigation system configured to determine a navigation route for a robot.

12. The system of claim 11, wherein the first depth map for the scene identifies an overhanging object in the scene and a distance between the system and the overhanging object, and the navigation system is further configured to determine an adjustment to the navigation route based on the first depth map, such that the robot does not get stuck underneath the overhanging object.

13. The system of claim 12, wherein the first photoemitter comprises a light emitting diode configured to transmit near infrared light signals.

14. The system of claim 12, wherein the navigation system is configured to determine the second depth map for the scene at the second height corresponding to the second photoemitter based on a phase difference between the modulated light signal from the second photoemitter and the corresponding reflected light signal, the second height corresponds to a height of an object in the navigation route of the robot.

15. The system of claim 14, wherein the navigation system is configured to identify an obstacle in the navigation route for the robot and a distance between the robot and the obstacle in the navigation route based on the second depth map for the scene.

16. The system of claim 14, wherein the navigation system is configured to determine the third depth map for the scene at the third height corresponding to the third photoemitter based on a phase difference between the modulated light signal from the third photoemitter and the corresponding reflected light signal, the third height corresponds to a ground surface in front of the robot.

17. The system of claim 16 wherein the navigation system is further configured to identify a cliff in the ground surface in front of the robot and a distance between the robot and the cliff based on the third depth map for the scene at the third height.

18. The system of claim 16, wherein the second, and third photoemitters comprise light emitting diodes.

19. The system of claim 10, wherein the controller is further configured to:
- compare an amplitude of the reflected light signal to a first threshold and a second threshold, wherein the second threshold is lower than the first threshold;
- in response to the amplitude of the reflected light signal being greater than the first threshold, cause the particular photoemitter to transmit the modulated light signal at a first amplitude; and
- in response to the amplitude of the reflected light signal being less than the second threshold, cause the particular photoemitter to transmit the modulated light signal at a second amplitude.

\* \* \* \* \*